May 26, 1970  J. D. KUSIANOVICH  3,514,121
ATTACHMENT DEVICE

Filed May 16, 1968  2 Sheets-Sheet 1

INVENTOR
John D. Kusianovich
BY

May 26, 1970        J. D. KUSIANOVICH        3,514,121

ATTACHMENT DEVICE

Filed May 16, 1968        2 Sheets-Sheet 2

INVENTOR
John D. Kusianovich
BY

United States Patent Office 3,514,121
Patented May 26, 1970

---

3,514,121
ATTACHMENT DEVICE
John D. Kusianovich, Albuquerque, N. Mex., assignor to Energy Conversion Systems, Inc., Albuquerque, N. Mex., a corporation of New Mexico
Filed May 16, 1968, Ser. No. 736,915
Int. Cl. A63c 9/08
U.S. Cl. 280—11.35            6 Claims

ABSTRACT OF THE DISCLOSURE

This invention relates to an attachment device comprising a housing with one or more pairs of parallel rolling elements contained therein operably connected together by a flexible, extensible band under tension with each of the rolling elements engaging opposite sides of the band and being positioned between opposite parallel sides of the housing which sides act as retaining members of the rolling elements, and a retention means on one of the two sides for retaining one of the rolling elements in a predetermined position until sufficient rotational force is supplied to that element to overcome the retention force of the retention means, and an engagement means, such as a lever arm, is connected to the other rolling element so that rotational force can be applied to that rolling element which is in turn transmitted to the first rolling element to cause it, upon the rotational force reaching a predetermined strength, to move away from the retention means.

---

This invention relates to an attachment device, and in particular to an attachment device incorporating the principle of utilizing two rolling elements inside special guide surfaces and joined by a flexible, extensible member under tension.

There is a need in the art for an attachment device whose binding force can be adjusted and which will release when a predetermined force is applied. Such a device should be simple in construction, with a minimum of parts, and easy to use and maintain. Many devices exist in the prior art, but they do not satisfactorily meet the criteria set out above. Many of the prior art devices are too complicated and difficult to use, or their applications are limited.

It is therefore an object of the present invention to provide an attachment device of general utility which is easy to construct, simple and efficient in operation and easily maintained.

It is a further object of this invention to provide an attachment device having a variable binding force which may be adjusted so that it will automatically release when a predetermined force is applied.

Briefly, the objects of my invention are accomplished by providing a housing wherein are located one or more pairs of rolling elements with each pair being operably connected together by a flexible, extensible band under tension with opposite sides of the housing acting as retaining members of the rolling elements. A lever arm or engagement member is connected to one of each of the pair or pairs of rolling elements and the other of the pair is retained in a particular position within the housing by means of retention means, such as, a notch or protuberance adjacent to one wall of the housing. The width of the notch or distance of protrusion into the housing is variable so that the force required to dislodge the rolling element can be varied. When force is applied to the lever arm it tends to force the rolling element to which it is attached to rotate in one direction while the second of the pair of rolling elements tends to rotate in the opposite direction, and, if the applied force is sufficient, to roll out of the notch or over the protuberance by which it is retained. The retaining power of the attachment device is also varied by variation of the tension of the flexible, extensible band. The amount of force required to move the rolling elements may be varied by variation of the width of the notch of length of the protuberance into the housing, as well as by variation of the tension of the flexible, extensible band. By a modification of the housing and a change in the placement of the rolling elements, I can modify my device so that it may be used to couple two items together with a predetermined force.

Other objects and advantages of my invention will become apparent as the same is better understood by reference to the following drawings when accompanied by the specification. In the drawings.

Figure 2:
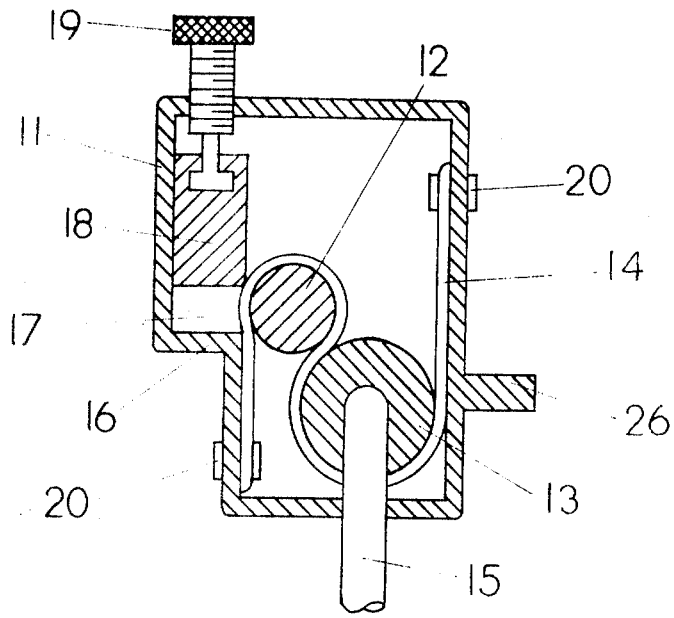
FIG. 2 is a partial cutaway view taken along lines 2—2 of FIG. 1.
Figure 1:
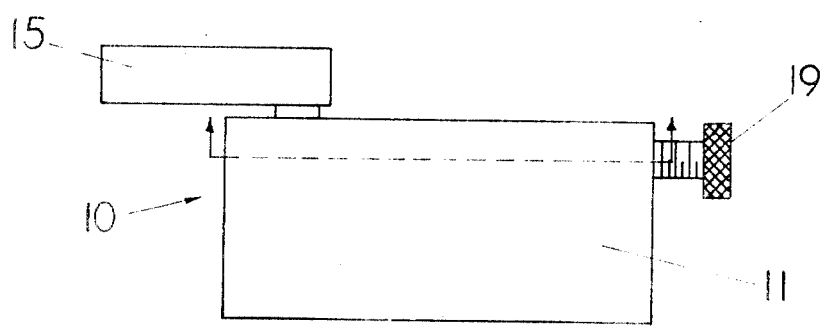
FIG. 1 is a side view of one modification of my attachment device.
Figure 3:
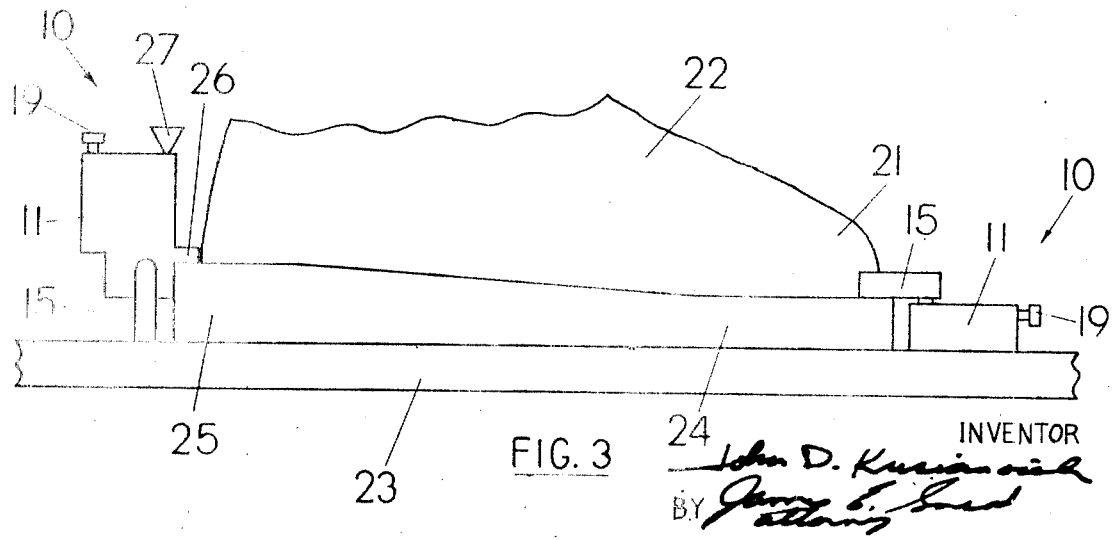
FIG. 3 is a partial view of two of my attachment devices being used as ski bindings.

One embodiment of my invention is shown in FIGS. 1–3. That particular embodiment 10 comprises a housing 11 in which are positioned a pair of rolling elements 12 and 13 operably connected together by a flexible, extensible band 14. An engagement means such as a lever arm 15 is shown to be fixedly connected to the longitudinal axis of rolling element 13 although it may be removable or indirectly connected to rolling element 13 such as through a gear train. A shoulder 16 is formed in one wall of housing 11 so that a gap 17 is formed between the inner wall of shoulder 16 and gap adjustment member 18. The width of gap 17 is determined by the positioning of gap adjustment member 18 which in turn is controlled by adjustment screw 19 which is secured into gap adjustment member 18 through an aperture in housing 11. Flexible, extensible band 14 is secured to the walls of housing 11 by any suitable means, such as rivets 20. Guides for the movement of rolling elements 12 and 13 are provided by gap adjustment member 18 and one wall of housing 11, respectively.

In its usual position rolling element 12 is retained within gap 17 so that it will not roll. When a sufficient force is applied to lever arm 15 rolling element 13 is caused to rotate in one direction while rolling element 12 is caused to rotate in the opposite direction. The amount of force required to dislodge rolling element 12 from its seat in gap 17 depends upon the width of the gap, which in turn is controlled by gap adjustment member 18 and adjustment screw 19.

The rotational forces of rolling elements 12 and 13 may be adjusted by reducing the amount of material in the band as by making a slot in it or placing holes in it. A difference in the rotational force of the two rolling elements simulates a spring action. Once the rotational force is removed from lever arm 15 the entire assembly returns to its normal position wherein rolling element 12 is seated in gap 17.

In FIG. 3, I show one application for my invention, that being its use as a ski binder. As shown in FIG. 3, two of the attachment devices are used to bind a ski boot to a ski, and of course, additional units could be provided if needed. In particular, it would be desirable to place one attachment device on each side of the toe of the boot and possibly one attachment device on each side of the heel of the boot to retain it securely.

In the application of my invention as shown in FIG. 3, I demonstrate two different ways which my attachment device 10 may be used to secure one object to another. In attaching the toe 21 of ski boot 22 to ski 23, I secure housing 11 to ski 23 so that lever arm 15 slides over sole 24. A similar attachment device would be secured to ski 23 on the opposite side of toe 21 so that the toe would be bracketed between the two lever arms and thus secured against either vertical or horizontal movement unless sufficient force is applied to overcome the spring action of rolling elements 12 and 13 as previously described. The amount of force required may be varied by means of adjustment screw 19.

A modification in the manner of securing attachment device 10 to ski 23 is shown in FIG. 3 at the heel 25 of ski boot 22. In this modification, lever arm 15 is secured to ski 23 and housing 11 is rotatably attached to lever arm 15. A shoulder 26 is fixedly secured to housing 11 and perpendicular to the walls thereof to engage the sole 24 of ski boot 22 at its heel 25 and thus secure against movement of the heel in the vertical plane. Rotation of housing 11 and its attached shoulder 26 in the vertical plane about lever arm 15 is inhibited by the spring force of lever arm 15 which is connected through housing 11 to second rolling element 13 within housing 11. The attachment device may be removed from its engagement with heel 25 of ski boot 22 by application of sufficient force to overcome the spring action of the device. The amount of force required can be varied in the manner heretofore described. A notch 27 may be affixed to housing 11 to facilitate movement of the housing by inserting a ski pole into notch 27 and applying sufficient force to disengage shoulder 26 from the skit boot. Insertion of a ski pole point at an angle into notch 27 causes an application of force to the attachment device. When sufficient force to overcome the spring action of lever arm 15 is applied housing 11 rotates in the vertical plane causing disengagement of shoulder 26 from the sole 25 of the ski boot.

Figure 4:
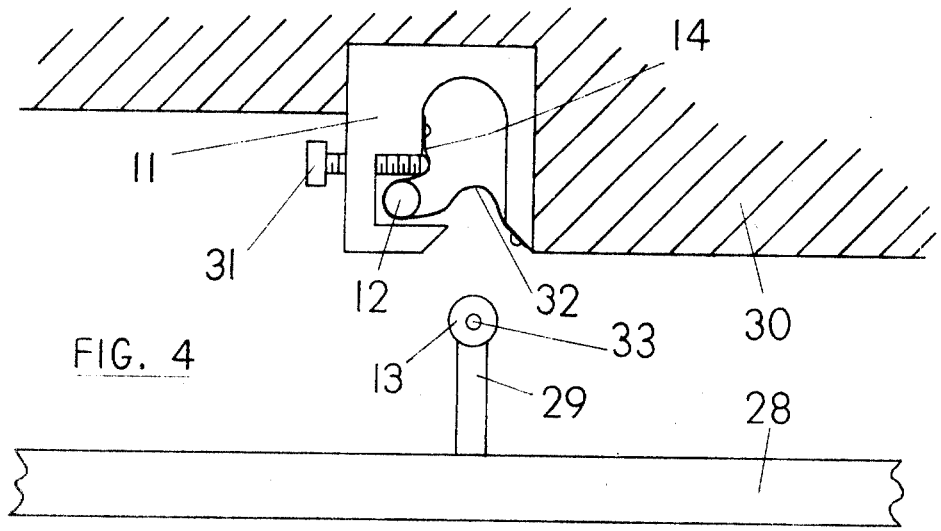
FIG. 4 is a partial cutaway view of a modification of my invention in unassembled form.
Figures 5, 6:
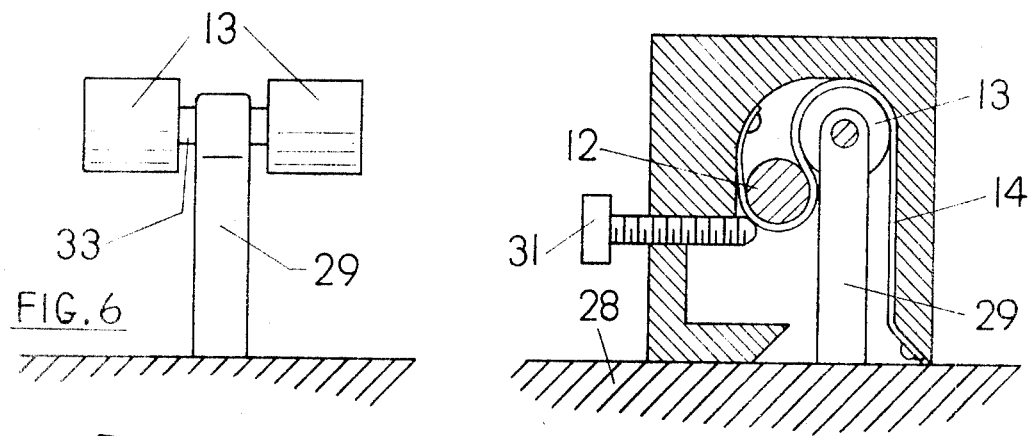
FIG. 5 is a partial cutaway view of the modification of my invention shown in FIG. 4 when assembled.
FIG. 6 shows two of the rolling elements which comprise a part of this invention connected in tandem for use in that modification of my invention shown in FIGS. 4 and 5.

Referring now to FIGS. 4–6, I show a modification of my attachment device which operates on the same principle as the device shown in FIGS. 1–3, but may be used in different applications of the invention.

In the modification shown in FIGS. 4–6, rolling element 13 is not secured within housing 11 but rather it is fixedly connected to a first member 28 by means of shaft 29 so that first member 28 may be removably coupled to second member 30. Pin 33 rotatably connects rolling element 13 to shaft 29. Housing 11 is fixedly secured to second member 30 by any suitable means. A modified adjustment screw 31 protrudes into the inside of housing 11 through an aperture provided therein. Rolling element 12 is secured within housing 11 and engaged by flexible, extensible band 14. A preformed loop 32 is provided in flexible, extensible band 14 within housing 11 to receive rolling element 13. In the view shown in FIG. 5, the first member 28 is disengaged from second member 30. Rolling element 12 may traverse a fixed guided path through housing 11.

Referring now to FIG. 5, it will be seen that first member 28 has been coupled to second member 30 by the insertion of rolling element 13 into housing 11. Flexible, extensible band 14 then engages rolling elements 12 and 13 respectively in the manner heretofore described and the force required to insert second roller element 13 into housing 11 against the pressure of flexible, extensible band 14 and rolling element 12 which abuts the protrusion of modified adjustment screw 31 into housing 11, depends upon the extent to which adjustment screw 31 protrudes into housing 11. Obviously, the position of adjustment screw 31 may be changed either before or after the two members are coupled together simply by turning the screw. Inserting the screw further into the housing would require a greater force to either insert or remove rolling element 13 from the housing and a decrease in the distance modified adjustment screw 31 protrudes into housing 11 would decrease the force required to insert or remove rolling element 13 into or out of housing 11. As can be seen in FIG. 5, rolling element 13 is larger in diameter than rolling element 12 so that rolling element 12 must pass over protuberance 31 into the depression before rolling element 13 can be removed from housing 11.

In FIG. 6, I show a modification of my invention wherein two rolling elements are connected in tandem so that two of my attachment devices may be used at the same time. Obviously, any number of devices could be used together without deviating from the essence of my invention.

Figure 7:
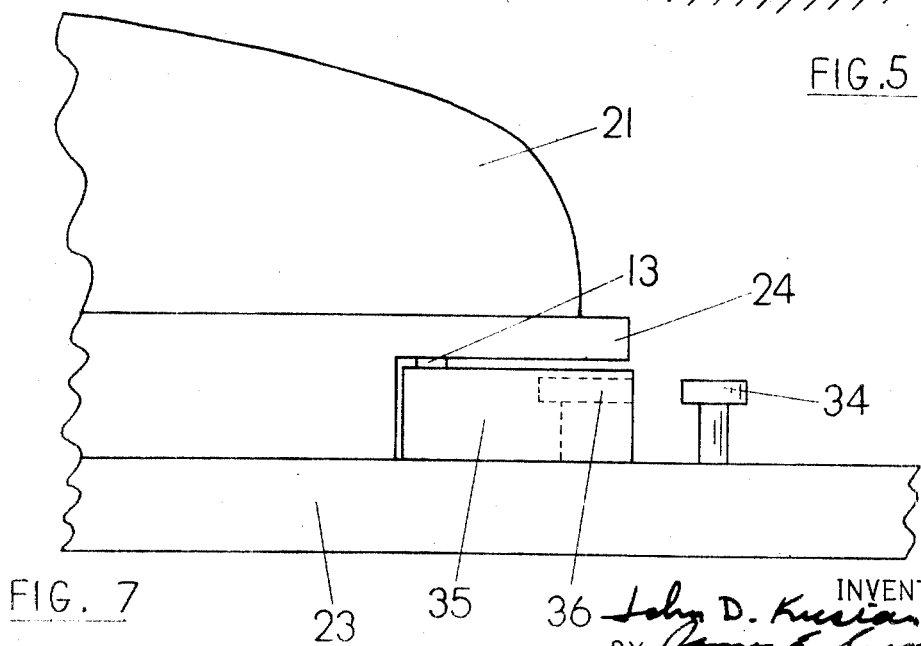
FIG. 7 is a further modification of my attachment device used as a ski binding.

In FIG. 7, I show a further modification of my invention used as a ski binder. In this particular modification, a section is removed from the toe portion of the sole 24 of a ski boot 21 and an attachment device 35 similar to that shown in FIG. 4 is inserted in place thereof. One roller 13 depends from the inset in sole 24 while the second roller and the flexible, extensible band are within attachment device 35 as shown in FIG. 4. A recess 36 is provided within attachment device 35 so that pin 34 may be inserted therein. Pin 34 is fixedly attached to ski 23.

When the modification of my device shown in FIG. 7 is used as a ski binder, attachment device 35 is inserted into the sole 24 of ski boot 21 and roller 13 engages the flexible, extensible band and second roller in the manner described in FIG. 4. The ski boot with attachment device 35 is then engaged with pin 34 to thus secure the toe of the boot against movement unless sufficient pressure is applied to disengage roller 13 from attachment device 35. If a twisting force is applied to the boot sufficient to cause attachment device 35 to rotate, then the boot slides from ski 23 and pin 34 is removed from recess 36. The heel of boot 21 may be attached to ski 23 in any suitable manner such as that shown in FIG. 3.

Obviously, many modifications and variations of the present invention are possible in light of the above teachings.

What is claimed is:
1. In an attachment device for connecting a first object to a second object, the combination comprising;
 a housing having at least two sides spaced opposite each other each having a flat surface facing that of the other;
 a first and a second rolling element, said first rolling element being adjacent and parallel to one of said two sides and having its longitudinal axis parallel to the longitudinal axis of said second rolling element, and said second rolling element being adjacent that side of said housing opposite said first rolling element;
 retention means operably connected to that one of said two sides of said housing to which said first rolling element is adjacent and parallel, for movably retaining said first rolling element in one position until a predetermined force is applied to said first rolling element to overcome the retaining force of said retention means;
 adjustment means operably connected to said retention means;
 a flexible extensible band having two ends, with one end being attached to one of said two sides of said housing and the other end being attached to the other of said two sides of said housing, said flexible, extensible band being adapted to engage each of said first and said second rolling elements and connect them together when the attachment device is in operating condition and to apply a tension force thereto;

said flexible, extensible band operably connecting said first and second rolling elements with each of said rolling elements engaging an opposite side of said band so that movement of said second rolling element is transmitted through said flexible, extensible band to cause movement of said first rolling element when a predetermined force is applied;

engagement means connected to said second rolling element and extending outside said housing;

whereby when the attachment device is assembled force applied to said engagement means is transmitted through said engagement means to said second rolling element, thence through said flexible, extensible band to said first rolling element and upon the force reaching a predetermined strength said first rolling element is dislodged from said retention means and the first and second rolling elements move within the housing.

2. An attachment device as described in claim 1, wherein;

said housing is enclosed on all sides;

said first and second rolling elements are located within said housing;

and said engagement means comprises a lever arm connected to the longitudinal axis of said second rolling element, whereby a force applied to said lever arm is transmitted to said rolling element and thence through said flexible, extensible band to said first rolling element.

3. The combination as defined in claim 2, wherein;

said retention means comprises an adjustable notch with one side of said adjustable notch being formed by one of said two sides of said housing, and the other side being formed of a movable block having an adjustment means attached thereto for moving said movable block to thereby vary the width of the said adjustable notch so that the amount of force required to unseat said first rolling element from said adjustable notch is thereby varied.

4. The combination as defined in claim 1, wherein;

said housing is open at at least one end so that said second rolling element and said engagement means attached thereto may be removed from said housing and said second rolling element disconnected from said flexible, extensible band.

5. The combination as defined in claim 4, wherein;

said retention means comprises a depression formed within that one of said two sides of said housing adjacent said first rolling element and said adjustment means comprises a screw which protrudes through the same side and adjacent to the depression; so that when the second rolling element is removed from the housing the first rolling element rests in the depression, and when the second rolling element is fully inserted into said housing said first rolling element is removed from the depression by the coaction of said second rolling element and said flexible, extensible band and lodged on that side of said adjustment screw opposite the depression.

6. The invention as defined in claim 1, including;

a boot having a toe portion with a sole attached thereto, said sole having a recess in the toe portion with said housing being secured therein by attachment of said engagement means to the recess in the toe of the boot;

said first and said second rolling elements being enclosed within said housing;

said housing having a first and a second side, said first side facing outwardly from said recess in the toe of the boot and having an opening therein;

a ski having a pin attached thereto with its logitudinal axis perpendicular to the longitudinal axis of the ski and being of the same external configuration as the internal surface of the opening in the housing and being adapted to be inserted within said opening so that the coaction of the pin, the flexible, extensible band, the first and second rolling elements and said engagement means prevents movement of the toe of the ski boot until sufficient force is applied to remove the first rolling element from the seat means so that the rolling elements move within the housing and the pin moves from its engagement within the opening in the housing.

References Cited

UNITED STATES PATENTS 2,396,373   3/1946   Henrichsen.
3,413,752   12/1968  Perry.

BENJAMIN HERSH, Primary Examiner

J. A. PEKAR, Assistant Examiner

U.S. Cl. X.R.

24—201, 230; 287—1